United States Patent [19]

Poppy et al.

[11] Patent Number: 4,750,052

[45] Date of Patent: Jun. 7, 1988

[54] APPARATUS AND METHOD FOR AUTOMATICALLY DELETING SELECTED PROGRAM INTERVALS FROM RECORDED TELEVISION BROADCASTS

[75] Inventors: Dwight J. Poppy, Arlington Heights; Quentin B. Samelson, Prospect Heights, both of Ill.

[73] Assignee: Zenith Electronics Corporation, Glenview, Ill.

[21] Appl. No.: 234,131

[22] Filed: Feb. 13, 1981

[51] Int. Cl.[4] ............................................. H04N 5/782
[52] U.S. Cl. ..................................... 358/335; 358/165; 358/908; 360/69; 360/71
[58] Field of Search ................... 360/33, 9-11, 360/14, 35, 69, 71; 358/127, 10, 139, 160, 165-167, 185, 188, 198, 908, 335; 369/50

[56] References Cited

U.S. PATENT DOCUMENTS

| | | | |
|---|---|---|---|
| 3,011,030 | 11/1961 | Langendorf | 369/50 |
| 4,283,735 | 8/1981 | Fagger | 360/33 |
| 4,314,285 | 2/1982 | Bonner et al. | 360/33 |
| 4,319,286 | 3/1982 | Hanpachern | 360/33 |
| 4,325,088 | 4/1982 | Wright | 360/14 |

Primary Examiner—Robert L. Richardson

[57] ABSTRACT

A commercial eliminator and method for use with a video cassette recorder enables recording of the program content of a broadcast television signal while automatically eliminating all commercial intervals therefrom. The commercial eliminator comprises a detector for identifying the beginning and end of each commercial interval of the television signal and apparatus responsive thereto for operating the video recorder for advancing the video tape for recording the program content together with each commercial interval of the television signal and for rewinding the video tape substantially immediately after each of the commercial intervals has been recorded such that the next occurring commercial interval or program material is recorded thereover.

9 Claims, 3 Drawing Sheets

APPARATUS AND METHOD FOR AUTOMATICALLY DELETING SELECTED PROGRAM INTERVALS FROM RECORDED TELEVISION BROADCASTS

BACKGROUND OF THE INVENTION

The present invention relates generally to improvements in video cassette recorders and, more particularly, to an improved circuit for automatically eliminating the recordal of unwanted portions of a television broadcast.

Video cassette recorders (VCR) are currently in widespread use and are operable in a record mode for recording a television broadcast on a suitable video cassette tape. In a playback mode, the VCR is operable for coupling the previously recorded television broadcast to a conventional television receiver where it may be viewed at the convenience of the viewer. The use of VCR's has therefore provided a facility enabling the viewers of television broadcasts to control their viewing habits to an extent not heretofore possible by, for example, recording a television program at the time of its broadcast and then viewing the recorded program at a time convenient to the viewer. In order to provide an additional degree of viewer convenience, it has been proposed to provide apparatus controlling the VCR in its record mode for automatically inhibiting the recordal of unwanted portions of a television broadcast and, in particular, for inhibiting the recordal of advertising commercials which are typically interspersed throughout desired programming materials such as movies, sporting events and the like. Ideally, the advertising commercials are completely eliminated without viewer intervention such that, upon playback of the video cassette tape, only the desired programming material is presented to the viewer.

In one known system of the foregoing type, apparatus is provided for eliminating color commercials when recording a monochrome television program. In particular, the presence of the color burst in the television signal used to transmit the color commercial is detected and places the VCR in a "pause" mode wherein the video tape is not allowed to advance. Since the television signal used to transmit the monochrome program does not include a color burst, this programming material will be recorded in a normal manner. It will be appreciated that apparatus of this sort is severely limited in that it will not function properly for television signals transmitting color programming.

In another known prior art apparatus, means are provided for simultaneously detecting the absence of sound and the fade of video to black level which normally occurs for a short interval at the beginning and end of commercials. In response to the detection of these conditions, the VCR is placed in "pause" for a fixed time interval, usually about 30 seconds. While a device of this type is operable in the case of television programs transmitted in color, it suffers from the disadvantage that 30 seconds of the programming material following the last of a series of commercials will not be recorded due to the fade detection made at the end of the last commercial. Also, if a commercial is longer than 30 seconds the last part of the commercial will be recorded.

In view of the foregoing, it is a basic object of the invention to provide improved apparatus automatically operating a video cassette recorder for inhibiting the recordal of unwanted portions of a television broadcast.

It is a more specific object of the invention to provide an automatic commercial eliminator for use with a video cassette recorder which is useful in association with both monochrome and color programming materials and which minimizes the amount of non-recorded desired programming and also insures that any normal commercial, regardless of its length, will not be recorded.

BRIEF DESCRIPTION OF THE DRAWINGS

The features of this invention which are believed to be novel are set forth with particularity in the appended claims. The invention, together with its objects and the advantages thereof, may best be understood by reference to the following description taken in conjunction with the accompanying drawings, in which like reference numerals identify like elements in the several figures and in which:

DESCRIPTION OF THE PREFERRED EMBODIMENT

Figure 1:
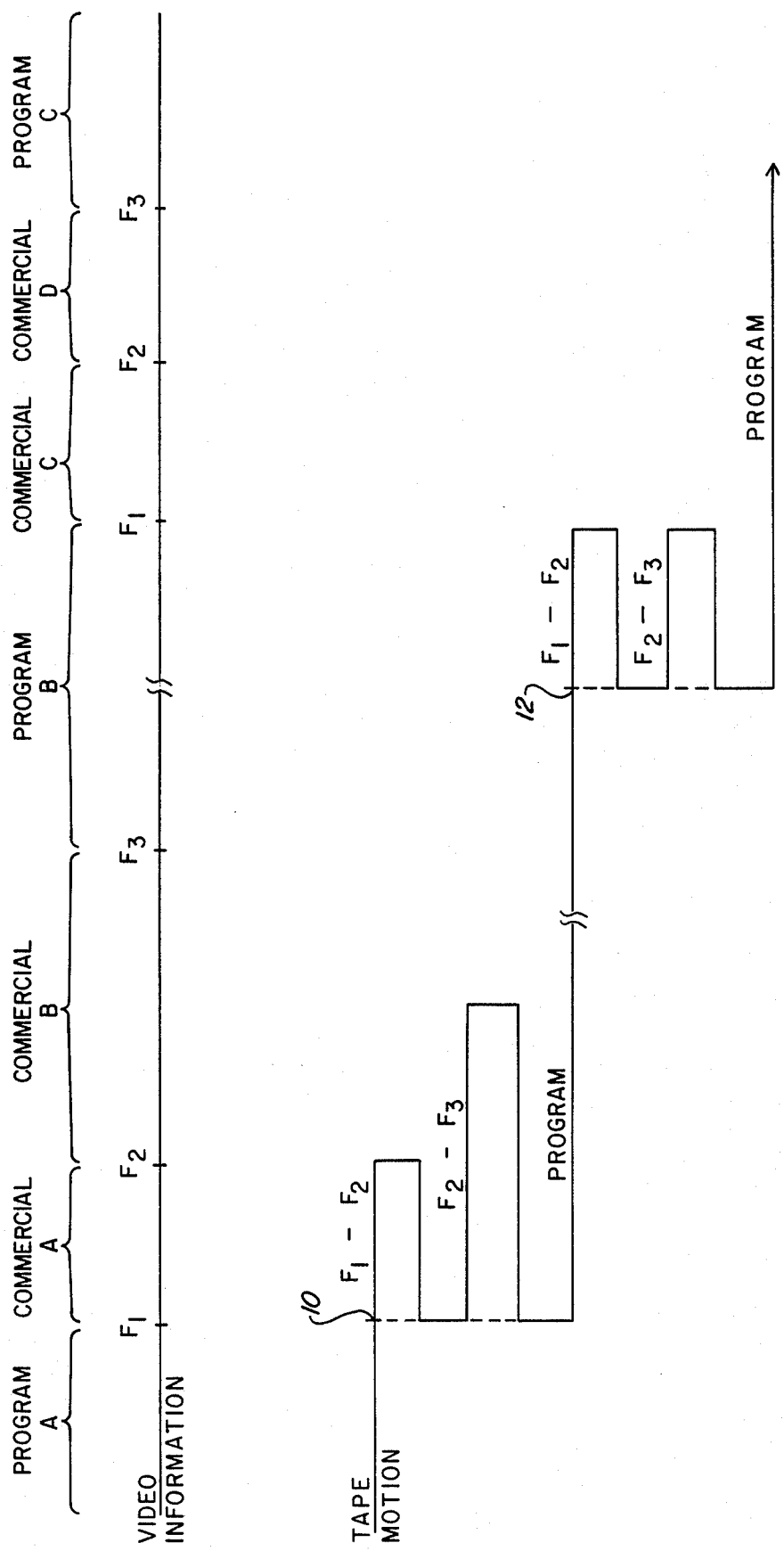
FIG. 1 graphically depicts the method of operating a video cassette recorder according to the present invention.

FIG. 1 graphically depicts the technique by which apparatus constructed in accordance with the teachings of the present invention is effective for operating a video cassette recorder for recording the program content of a broadcast television signal while automatically eliminating all commercial intervals from the recording. As used herein, the term program content or program interval is intended to encompass any portion or portions of a broadcast television signal which a viewer desires to record such as a movie, a sporting event, etc. and is to be contrasted with the term commercial interval which is intended to encompass any portion or portions of a broadcast television signal which the viewer desires to eliminate from the recording and which may include, but is not limited to commercial advertisements, network or local promotions, newsbriefs and the like, Also, the source of the television signal is not to be considered as a limitation on the invention and may therefore be derived through "over-the-air" broadcasts, from cable systems or any other source of conventional television broadcasting.

Referring now in detail to FIG. 1, the video content or information supplied by a conventional television signal is seen to comprise a series of program intervals of relatively long duration separated from each other by one or more commercial intervals of substantially shorter duration. A number of consecutive program intervals may, for example, constitute an entire sporting event while the commercial intervals represent commercial advertisements broadcast at various times throughout the sporting event. In accordance with the present invention, and as illustrated by the chart of FIG. 1 depicting tape motion, the video cassette recorder is operated such that its video tape is advanced for recording each program interval such as program interval A of FIG. 1. Each fade of video and sound that occurs in the television signal is detected for identifying the beginning or end of a commercial interval. More specifically, the first fade $F_1$ that occurs between the end of a program interval and the beginning of the first subsequent commercial interval is detected and used for defining a reference point on the tape. The tape in the video recorder continues to be advanced recording the first commercial until a second fade $F_2$ defining the end of the commercial is detected. At this point, the video recorder is operated such that the tape is rewound until the reference point is reached. Thereafter, the tape is again advanced for recording the next occurring commercial or program interval. If the latter interval is another commercial interval, the tape is again rewound to the reference point after the commercial has been recorded. If, on the other hand, the latter interval is a program interval, the tape continues to advance recording the entire interval until a new series of commercial intervals is encountered wherein the preceding operation is repeated with a new tape reference point being established as described above.

In order to enable proper performance of the foregoing technique, it is necessary to distinguish the initial fade $F_1$ occurring between the end of a program interval and the beginning of the first subsequent commercial interval from the remaining fades $F_2$, $F_3$ . . . occurring between commercial intervals and between the last of a series of one or more commercial intervals and the subsequent program interval. This is necessary since only fades $F_2$, $F_3$ . . . key tape rewind whereas fades $F_1$ are only used to identify the tape rewind reference points. In accordance with the invention this function is achieved by establishing a predetermined timing interval following each detected fade, a subsequent fade occurring within the predetermined timing interval being defined as a fade $F_2$, $F_3$ . . . for keying tape rewind and a subsequent fade occurring outside the timing interval being defined as a fade $F_1$ identifying a new tape rewind reference point. The predetermined timing interval is preferably selected to be longer than the longest expected commercial interval but shorter than the shortest expected program interval.

With further reference now to the specific example of FIG. 1, it will be observed that the tape is initially advanced for recording program interval A until the initial fade $F_1$ between program interval A and commercial interval A is detected. Fade $F_1$ is used to identify a reference point 10 on the tape which continues to be advanced recording commercial interval A until fade $F_2$ is detected. Since fade $F_2$ occurs within the established predetermined timing interval, the tape is automatically rewound back to reference point 10 and thereafter again allowed to advance recording commercial interval B until fade $F_3$ is detected. Since fade $F_3$ also occurs within the established timing interval the tape is again automatically rewound back to reference point 10 after which it is again allowed to advance recording program interval B. Upon detecting the next fade $F_1$ defining the beginning of commercial interval C a new tape rewind reference point 12 is established and the fore-going procedure is repeated. As a result, the final recording includes only program intervals to the exclusion of all commercial intervals. It will be appreciated that this result is achieved by selectively activating the rewind function of the recorder and is to be distinguished from the prior art approaches which rely on activation of the pause function of the recorder. Also, quite advantageously, it will be appreciated that a false fade, i.e. one not defining the beginning or end of a commercial, occurring during a program interval will not affect the recording unless a second fade is detected within the established timing interval. As a consequence, it is considered with a relatively high degree of confidence that an inadvertent rewind operation will not occur during a program interval.

Figure 2:
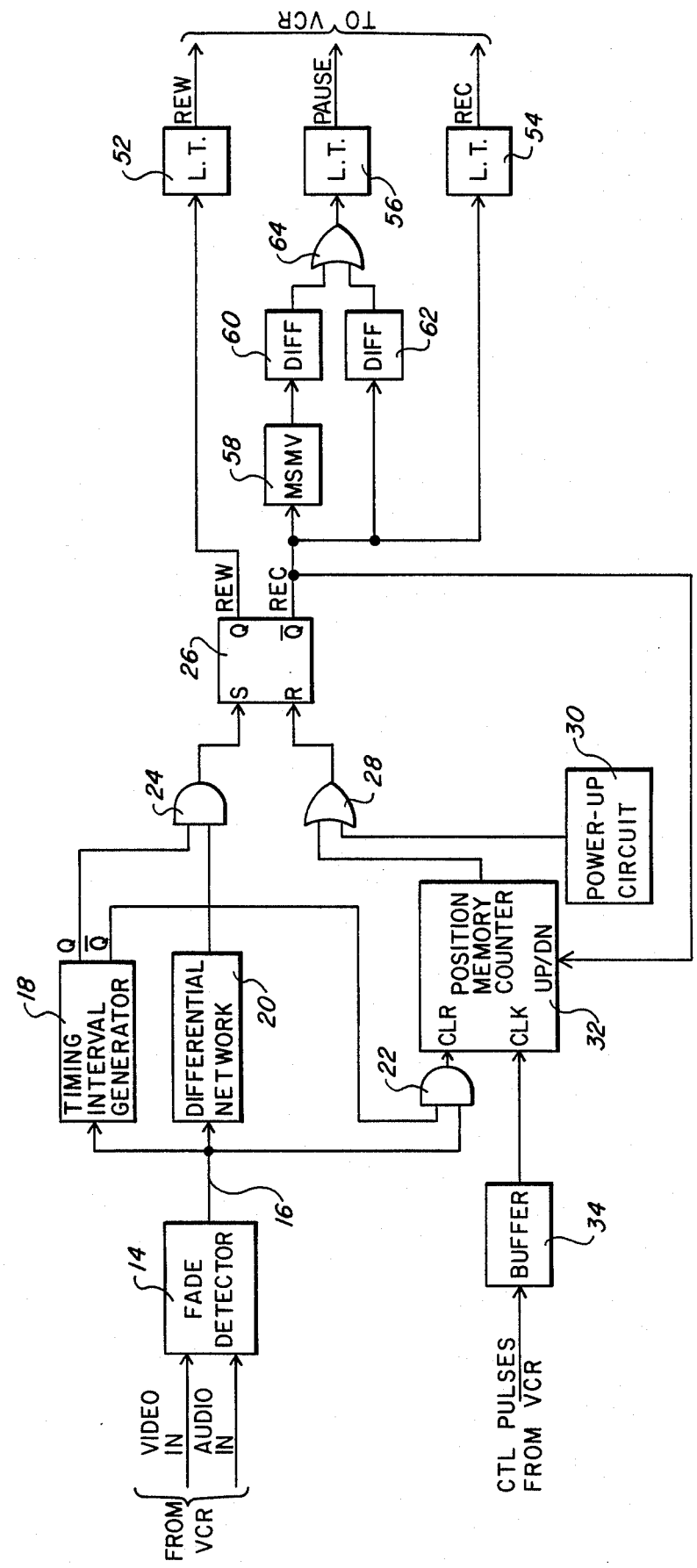
FIG. 2 is a block diagram illustrating one embodiment of a circuit constructed according to the present invention.

FIG. 2 illustrates one preferred embodiment of a circuit for automatically operating a video cassette recorder according to the novel technique of the present invention as described above. A fade detector 14 is responsive to input baseband video and audio signals derived from the recorder and representing a received television signal. Fade detector 14 develops a fade pulse $F_1$, $F_2$, $F_3$, . . . on an output conductor 16 in response to the simultaneous absence of sound and the fade to black level of the video signal, which condition normally occurs at the beginning and end of each commercial interval. The fade pulses are coupled from conductor 16 to the inputs of a timing interval generator 18, a differential network 20 and an AND gate 22. Differential network 20 differentiates the fade pulses developed on conductor 16 and supplies the differentiated pulses to one input of a second AND gate 24, the second input of AND gate 24 being derived from the Q output of timing interval generator 18. The Q output of timing interval generator 18 goes logically high in response to each initial fade pulse $F_1$ developed on conductor 16 shortly after the development of the corresponding differentiated pulse by network 20 and remains logically high for a time period after the last of the associated and subsequently occurring fade pulses $F_2$, $F_3$, . . . , which time period corresponds to the previously mentioned predetermined timing interval and preferably has a value of about 100 seconds. Thus, for example, with reference to FIG. 1, the Q output of timing interval generator 18 would go logically high in response to fade pulse $F_1$ occurring between program interval A and commercial interval A and would remain logically high until about 100 seconds after the occurrence of fade pulse $F_3$ occurring between commercial interval B and program interval B.

The output of AND gate 24 is coupled to the set input of an RS flip-flop 26, the reset input of flip-flop 26 being derived from the output of an OR gate 28. OR gate 28 receives one input from a power-up circuit 30 which is adapted for developing an output pulse when power is initially applied to the recorder. OR gate 28 receives a second input from an output of a position memory up-down counter 32 which is adapted for establishing the tape reference points previously described. The up-down count control input of counter 32 is derived from the $\overline{Q}$ output of flip-flop 26 which represents a record enable control signal, the Q output of flip-flop 26 representing a rewind control signal. The clear input of counter 32 is supplied from the output of AND gate 22 while the counter's clock input is driven through a suitable level translating buffer 34 by the CTL (control track) pulses developed by the recorder at a rate of one pulse per video frame.

In operation, when power is initially applied to the recorder a pulse is coupled from power-up circuit 30 through OR gate 28 resetting flip-flop 26 and causing its $\overline{Q}$ output to go logically high thereby enabling the record mode of operation of the recorder. Assuming that the foregoing occurs during program interval A of FIG. 1, the recorder will begin advancing the video tape for recording program interval A if the record switch has also been depressed on the recorder. Fade detector 14 then develops a first fade pulse $F_1$ between the end of program interval A and the beginning of commercial interval A, fade pulse $F_1$ clearing counter 32 through AND gate 22 which is enabled by the logically high $\overline{Q}$ output of timing interval generator 18. Since the $\overline{Q}$ output of flip-flop 26 is also logically high counter 32 is conditioned for counting CTL pulses in an up direction. Fade pulse $F_1$ also causes a corresponding differentiated pulse to be applied to one input of AND gate 24 and, shortly thereafter, causes the Q output of timing generator 18 to go high enabling counter 32 for counting CTL pulses. Since the output of AND gate 24 remains logically low, flip-flop 26 is maintained in a reset condition enabling the recording of commercial interval A while counter 32 continues to count CTL pulses.

Fade pulse $F_2$, which is developed at the output of fade detector 14 between commercial intervals A and B, results in a corresponding differentiated pulse being coupled through AND gate 24 which has been enabled by the logically high Q output of timing generator 18. The differentiated pulse sets flip-flop 26 causing its Q output to go logically high and thereby placing the recorder in its rewind mode of operation. At the same time, counter 32 is operated for counting down from its previously achieved state in response to the low $\overline{Q}$ output of flip-flop 26. In this regard, it will be noted that fade pulse $F_2$ is ineffective for clearing counter 32 because AND gate 22 is disabled by the logically low $\overline{Q}$ output of timing generator 18. The recorder will consequently rewind the video tape until a zero state is achieved by counter 32 (corresponding to reference point 10 on the tape) whereupon the counter couples an output pulse through OR gate 28 resetting flip-flop 26 and again enabling the record mode. Commercial interval B is therefore recorded on the tape beginning at reference point 10 while counter 32 again begins up counting CTL pulses starting from its zero state. The same procedure is repeated in response to fade pulse $F_3$. That is, at the end of commercial interval B the video tape is rewound to reference point 10 after which the following program interval B is recorded. About 100 seconds after the development of fade pulse $F_3$ and during the recording or program interval B the Q output of timing generator 18 goes logically low disabling gate 24 while enabling gate 22 thereby conditioning the circuit for repeating the entire operation as described above in response to the next developed fade pulse $F_1$. It will be observed that had another fade pulse (i.e. $F_4$) been developed after fade pulse $F_3$ and within the 100 second timing interval, the period between pulses $F_3$ and $F_4$ would have been treated as another commercial interval initiating another rewind operation back to reference point 10 before program interval B would have been recorded. In this manner, while each commercial interval is recorded on the video tape, the recording is effectively eliminated by rewinding the tape at the end of the commercial interval back to the end of the previous program interval.

Figures 3, 4:
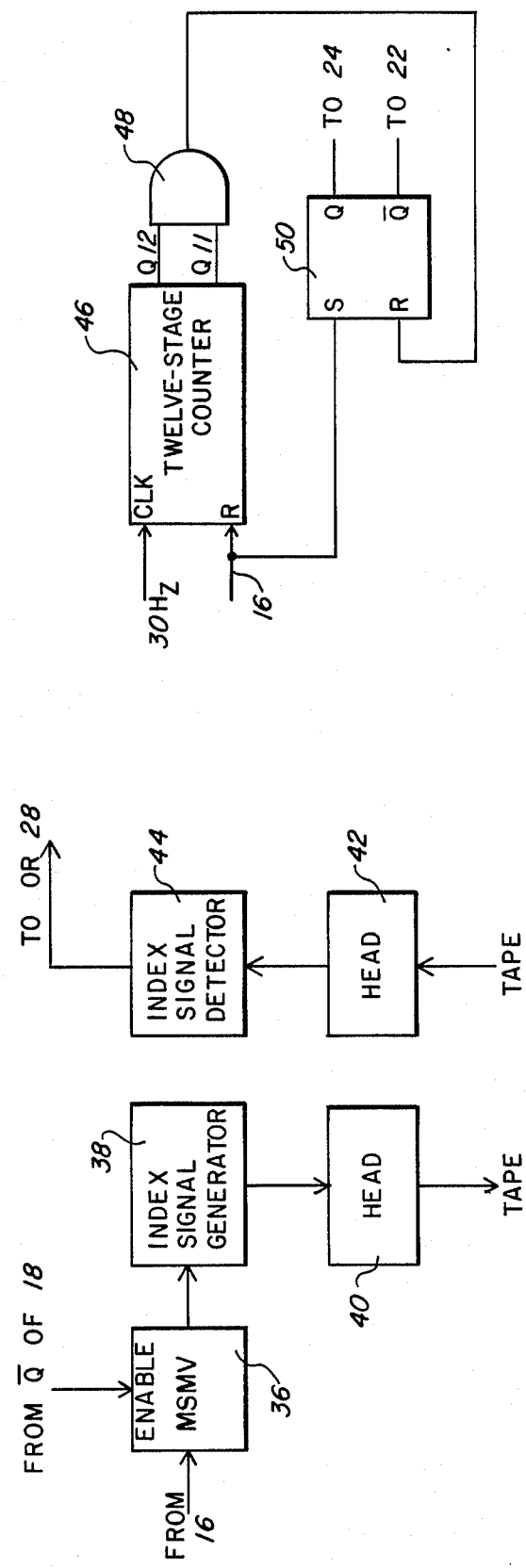
FIG. 3 is a block diagram illustrating an alternate embodiment of a circuit constructed according to the present invention.
FIG. 4 is a block diagram illustrating the timing interval generator shown generally in FIG. 2.

FIG. 3 illustrates an alternate embodiment of the circuit of FIG. 2 wherein the reference points of the video tape are identified by placing and detecting suitable index pulses on the tape itself thereby eliminating the need for counter 32, the remaining portions of the circuit being unchanged. More specifically, upon detection of a first fade pulse $F_1$, a monostable multivibrator 36, which is enabled by the logically high $\overline{Q}$ output of timing generator 18, is triggered for developing an output pulse activating an index signal generator 38 for placing a suitable index pulse on the video tape through a head 40 of the recorder, which index pulse identifies the tape reference points 10, 12. The index pulse may be placed in the video band or superimposed on the audio or CTL tracks of the video tape. Subsequently, when the tape is rewound in response to flip-flop 26 being placed in a set condition, a head 42 (which may be the same as head 40) is adapted for reading the video tape and activating an index signal detector 44 when the index pulse is reached. Index signal detector 44 then couples a suitable signal through OR gate 28 resetting flip-flop 26 which re-enables the record mode of operation.

FIG. 4 illustrates a preferred embodiment of timing interval generator 18. The generator comprises a multistage counter 46, a twelve stage counter being shown in the drawing, having a reset input connected to conductor 16 and a clock input supplied with a 30 Hz clock signal developed in the recorder. The outputs of the final two stages $Q_{11}$ and $Q_{12}$ of counter 46 are connected to the inputs of an AND gate 48 whose output supplies the reset input of an RS flip-flop 50. The set input of flip-flop 50 is connected to conductor 16. In operation, each first fade pulse $F_1$ developed on conductor 16 resets counter 46 and sets flip-flop 50 whose Q output goes logically high. Counter 46 begins counting the 30 Hz clock pulses until it reaches state 1100 0000 0000 whereupon an output is developed by AND gate 48 resetting flip-flop 50 (approximately 102.4 seconds after fade pulse $F_1$). However, if before reaching this state, a subsequent fade pulse $F_2$ is developed, counter 46 is reset and begins counting again from zero. Thus, the Q output of flip-flop 50, which comprises the Q output of generator 18, goes high in response to the first fade pulse $F_1$ and stays high until about 102.4 seconds after the last of the associated fade pulses $F_2, F_3 \ldots$.

Referring back to FIG. 2, it will be observed that the rewind and record enable signals developed by flip-flop 26 are coupled through a pair of appropriate level translating circuits 52 and 54 before being applied to the video recorder. In addition, the record enable signal is supplied to a pause signal generating circuit whose output is coupled through another level translating circuit 56 before being applied to the video recorder. The purpose of the pause signal generating circuit is to develop a pause signal placing the recorder in a pause mode of operation for a short time interval before going into a record mode of operation. This brings the recording heads up to speed before recording is initiated which has been found to improve the quality of the recording. The pause signal generating circuit comprises a monostable multivibrator 58 having an input connected to the $\overline{Q}$ or record enable output of flip-flop 26 and an output connected to one input of an OR gate 64 through a differential network 60. The second input to OR gate 64 is derived from the output of a second differential network 62 whose input is connected to the $\overline{Q}$ output of flip-flop 26. The leading edge of each record enable signal is differentiated by network 62 and coupled as a signal spike through OR gate 64 for initiating the pause mode of operation. The leading edge of the record enable signal also triggers monostable multivibrator 58 which produces a positive going transition a short time thereafter. This positive going transition is differentiated by network 60 and coupled as a second signal spike through OR gate 64 for inhibiting the pause mode of operation whereby recording is permitted to begin.

While particular embodiments of the invention have been shown and described, it will be apparent that changes and modifications may be made therein without departing from the invention in its broader aspects. The aim of the appended claims, therefore, is to cover all such changes and modifications as fall within the true spirit and scope of the invention.

What is claimed is:

1. For use with a video recorder operable for recording a television signal on a video tape, said television signal defining a series of first program intervals each having a duration exceeding a predetermined duration and separated from each other by one or more (commercial) second program intervals each having a duration less than said predetermined duration, the method comprising:

responsive to said television signal, developing a control signal defining each transition between adjacent ones of said program (detecting the beginning and end of each of said commercial) intervals; and responsive to said control signal (detecting), advancing said video tape for recording each of said first and second program (and commercial) intervals, and rewinding said video tape substantially immediately after each of said second program (commercial) intervals have been recorded such that the next occurring first and second (commercial or) program interval is recorded thereover.

2. For use with a video recorder operable for recording a television signal on a video tape, said television signal defining a series of first program intervals each having a duration exceeding a predetermined duration and separated from each other by one or more (commercial) second program intervals each having a duration less than said predetermined duration, the method comprising:

responsive to said television signal, developing a control (detection) signal defining each transition between adjacent ones of said program (identifying the beginning and end of each of said commercial) intervals:

defining a reference position of said video tape in response to a (representing) first one of said control (detection) signals defining a transition between adjacent first and second program intervals (developed in response to a consecutively occurring group of one or more of said commercial intervals);

advancing said video tape for recording (each of said) the program (and commercial intervals) interval occurring immediately after said first control signal; and rewinding said video tape to said reference position only if the recorded program interval comprises one of said second program intervals (in response to each of the detection signals developed in response to said consecutively occurring group of commercial intervals other than said first detection signal).

3. For use with a video recorder operable for recording a television signal on a video tape, said television signal defining a series of first program intervals each having a duration exceeding a predetermined duration and separated from each other by one or more (commercial) second program intervals each having a duration less than said predetermined duration, the method comprising:

responsive to said television signal, developing a control (detection) signal defining each transition between adjacent ones of said program (identifying the beginning and end of each of said commercial) intervals;

defining in response to each of said control signals a predetermined timing interval corresponding to said predetermined duration;

generating a tape rewind signal in response to each of said control (detection) signals which occurs (occurring) within the (said) predetermined timing (time) interval defined by (after) the immediately preceding one of said control (detection) signals;

defining a reference position of said video tape in response to (representing) each of said control (detection) signals which occurs (occurring) outside the (said) predetermined timing (time) interval defined by (after) the immediately preceding one of said control (detection) signals;

advancing said video tape for recording each of said first and second program (and commercial) intervals; and rewinding said video tape to said reference position in response to each of said tape rewind signals.

4. In a video recorder operable for recording a television signal on a video tape, said television signal defining a series of first program intervals each having a duration exceeding a predetermined duration and separated from each other by one or more (commercial) second program intervals each having a duration less than said predetermined duration, the improvement comprising:

means responsive to said television signal for developing a control signal defining each transition between adjacent ones of said program (detecting the beginning and end of each of said commercial) intervals; and means responsive to said control signal (detecting means) for operating said video recorder for advancing said video tape for recording each of said first and second program (and commercial) intervals and for rewinding said video tape substantially immediately after each of said second program (commercial) intervals have been recorded such that the next occurring first or second (commercial or) program interval is recorded thereover.

5. In a video recorder operable for recording a television signal on a video tape, said television signal defining a series of first program intervals each having a duration exceeding a predetermined duration and separated from each other by one or more (commercial) second program intervals each having a duration less than said predetermined duration, the improvement comprising:

means responsive to said television signal for developing a control signal defining each transition between adjacent ones of said program (detecting the beginning and end of each of said commercial) intervals;

means defining a reference position of said video tape (representing the) in response to a first one of said (detection) control signals defining a transition between adjacent first and second program intervals (developed in response to a consecutively occurring group of one or more of said commercial intervals); and means operating said video recorder for advancing said video tape for recording (each of said) the program (and commercial intervals) interval occurring immediately after said first control signal and for thereafter rewinding said video tape to said reference position only if the recorded program interval comprises one of said second program intervals (in response to each of the detection signals developed in response to said consecutively occurring group of commercial intervals other than said first detection signal).

6. In a video recorder operable for recording a television signal on a video tape, said television signal defining a series of first program intervals each having a duration exceeding a predetermined duration and separated from each other by one or more (commercial) second program intervals each having a duration less than said predetermined duration, the improvement comprising:

means responsive to said television signal for developing a control signal defining each transition between adjacent ones of said program (detecting the beginning and end of each of said commercial) intervals;

means responsive to each of said control signals for defining a predetermined timing interval corresponding to said predetermined duration;

means generating a tape rewind signal in response to each of said control (detection) signals which occurs (occurring) within the (said) predetermined (time) timing interval defined by (after) the immediately preceding one of said control (detection) signals;

means defining a reference position of said video tape in response to (representing) each of said control (detection) signals which occurs (occurring) outside (said) the predetermined timing (time) interval defined by (after) the immediately preceding one of said control (detection) signals;
and means operating said video recorder for advancing said video tape for recording each of said first and second program (and commercial) intervals and for rewinding said video tape to said reference position in response to each of said tape rewind signals.

7. In a video recorder including tape drive means operable for advancing a video tape for recording a television signal and also operable for rewinding the video tape, said television signal defining a series of first program intervals each having a duration exceeding a predetermined duration and separated from each other by one or more second program intervals each having a duration less than said predetermined duration, the improvement comprising:

means responsive to said television signal for developing a control signal defining each transition between adjacent ones of said program intervals;

means responsive to each of said control signals for defining a predetermined timing interval corresponding to said predetermined duration;

means defining a reference position of said video tape in response to each of said control signals which occurs outside the predetermined timing interval defined by the immediately preceding one of said control signals;

control means responsive to said control signals for generating a tape advance signal adapted for operating said video recorder for recording each of said first and second program intervals and for generating a tape rewind signal adapted for operating said video recorder for rewinding said video tape to said reference position in response to each of said control signals which occurs within the predetermined timing interval defined by the immediately preceding one of said control signals; and conductor means for hard-wire coupling said tape advance and rewind signals to the tape drive means of said video recorder.

8. In a video recorder including tape drive means operable for advancing a video tape for recording a television signal and also operable for rewinding the video tape, said video recorder developing a timing signal comprising a sequence of control pulses representing video tape motion, said television signal defining a series of first program intervals each having a duration exceeding a predetermined duration and separated from each other by one or more second program intervals each having a duration less than said predetermined duration, the improvement comprising:

means responsive to said television signal for developing a control signal defining each transition between adjacent ones of said program intervals;

means responsive to each of said control signals for defining a predetermined timing interval corresponding to said predetermined duration;

counting means for assuming a selected state defining a reference position of said video tape in response to each of said control signals which occurs outside the predetermined timing interval defined by the immediately preceding one of said control signals;

control means responsive to said control signals for generating a tape advance signal adapted for operating said video recorder for recording each of said first and second program intervals while operating said counting means for counting said control pulses in a forward direction and responsive to each of said control signals which occurs within the predetermined timing interval defined by the immediately preceding one of said control signals for generating a tape rewind signal adapted for operating said video recorder for rewinding said video tape while operating said counting means for counting said control pulses in a reverse direction until said selected state defining said reference position of said video tape is achieved; and conductor means for hard-wire coupling said tape advance and rewind signals to the tape drive of said video recorder.

9. In a video recorder including tape drive means operable for advancing a video tape for recording a television signal and also operable for rewinding the video tape, said television signal defining a series of first program intervals each having a duration exceeding a predetermined duration and separated from each other by one or more second program intervals each having a duration less than said predetermined duration, the improvement comprising:

means responsive to said television signal for developing a control signal defining each transition between adjacent ones of said program intervals;

means responsive to each of said control signals for defining a predetermined timing interval corresponding to said predetermined duration;

means magnetically recording an index signal on said video tape defining a reference position thereof in response to each of said control signals which occurs outside the predetermined timing interval defined by the immediately preceding one of said control signals;

control means responsive to said control signals for generating a tape advance signal adapted for operating said video recorder for recording each of said first and second program intervals and responsive to each of said control signals which occurs within the predetermined timing interval defined by the immediately preceding one of said control signals for generating a tape rewind signal adapted for operating said video recorder for rewinding said video tape while magnetically reading the tape until said index signal is detected; and conductor means for hard-wire coupling said tape advance and rewind signals to the tape drive means of said video recorder.

* * * * *

UNITED STATES PATENT AND TRADEMARK OFFICE
CERTIFICATE OF CORRECTION

PATENT NO. : 4,750,052

DATED : June 7, 1988

INVENTOR(S) : Dwight J. Poppy and Quentin B. Samelson

It is certified that error appears in the above-identified patent and that said Letters Patent is hereby corrected as shown below:

> In claims 1-6, delete all parenthetical words and phrases and the associated parenthesis.

Signed and Sealed this

Twentieth Day of December, 1988

*Attest:*

DONALD J. QUIGG

*Attesting Officer*     *Commissioner of Patents and Trademarks*